H. D. SMITH.

Preparing Tobacco.

No. 2,468. Reissued Jan'y 29, 1867.

Witnesses:
Wm H Bishop.
Andrew DeLacy.

Inventor:
Henry D. Smith

N. PETERS, Photo-Lithographer, Washington, D. C.

UNITED STATES PATENT OFFICE.

HENRY D. SMITH, OF NEW YORK, N. Y., ASSIGNOR TO C. W. SWEET AND JOHN F. GREENE.

IMPROVED MODE OF PREPARING CHEWING-TOBACCO.

Specification forming part of Letters Patent No. 46,823, dated March 14, 1865; Reissue No. 2,468, dated January 29, 1867.

*To all whom it may concern:*

Be it known that I, HENRY D. SMITH, of the city, county, and State of New York, have invented a new and Improved Mode of Preparing and Putting up Cut Tobacco; and I do hereby declare that the following is a full, clear, and exact description thereof, reference being had to the accompanying drawings, making part of this specification, in which—

Figure 1:
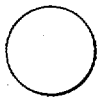
Figure 2:
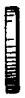

Figure 1 represents a face view, and Fig. 2 an edge view, of a pellet of tobacco prepared and put up according to my improved mode.

What is known as "cut tobacco" has heretofore been but up in packages enveloped in tin-foil or in paper. The envelope, whether of paper or tin-foil, when cut or broken open to give access to the inclosed tobacco, is wasted, and much of the contained tobacco thus liberated goes to waste.

The object of my invention is to avoid the objections to the mode of putting up cut tobacco as heretofore practiced; and to this end my said invention consists in enveloping the fine-cut tobacco in tobacco-leaves, and when so enveloped submitting the package to pressure, to compact the whole, so that when relieved of the pressure it will hold together, and may be cut or pieces broken off without waste, the envelope being as good for use as the inside, so that there need be no waste either of the inside or the envelope of the package. I take the fine-cut tobacco, such as heretofore prepared for the market, and in any suitable quantity spread it to the required thickness on leaf-tobacco, and I lay leaf-tobacco on the top and fold it around the edges, and when so prepared I put the package in a press and subject it to a heavy pressure, such as is usually applied in pressing plug-tobacco. When so prepared and put up the packages may be handled and transported, and will keep as well and safely as packages put up in paper or tin-foil, and the cut tobacco will be found to adhere sufficiently to admit, if desired, of cutting the packages into pellets of any size for use, as represented in the accompanying drawings, without liability to waste.

The packages can be made of any size desired, and, if made large, can be cut into small pieces for convenient use.

What I claim as my invention, and desire to secure Letters Patent, in preparing and putting up tobacco, is—

Enveloping the fine-cut tobacco in tobacco-leaves, or the equivalent thereof, and subjecting it when enveloped to pressure, substantially as described, and for the purpose set forth.

HENRY D. SMITH.

Witnesses:
WM. H. BISHOP,
ANDREW DE LACY.